Jan. 11, 1955    D. W. COTTLE    2,699,070
HERMETICALLY SEALED TORQUE TRANSMITTER
Filed Sept. 15, 1953

Inventor:
Donald W. Cottle,
by Nathan Comfeed
His Attorney.

United States Patent Office 2,699,070
Patented Jan. 11, 1955

2,699,070

HERMETICALLY SEALED TORQUE TRANSMITTER

Donald W. Cottle, Syracuse, N. Y., assignor to General Electric Company, a corporation of New York Application September 15, 1953, Serial No. 380,275

4 Claims. (Cl. 74—18)

This invention relates to torque transmitting devices, and more particularly, to such devices for transmitting torque to the interior of a hermetically sealed chamber.

Electrical equipment is sometimes utilized under conditions requiring that the equipment be sealed from outside atmospheric conditions. In the design of hermetically sealed electric equipment, a problem arises in the provision of means for adjusting variable circuit components contained within the electrical equipment. Either the variable component must be mounted outside of the sealed container and electrical connections made to the equipment through the wall of the container, or a sealed rotating control must be provided. Previously several hermetic torque transmitters have been devised, but these have been bulky and complicated in construction.

Accordingly, the principal object of the present invention is the provision of a hermetically sealed torque transmitter which is rugged in construction, small in size, and of low cost.

The principles of the present invention may be realized through the provision of a flexible diaphragm hermetically sealed to the container wall of the electrical equipment. Means are attached to the flexible diaphragm for making a nonrotatable connection with the shaft of the component to be controlled. In some modifications, means are provided to retain the flexible diaphragm against the force of air pressure either from within the container or from without the container.

The features of my invention which are believed to be novel are set forth with particularity in the appended claims. The invention itself, however, both as to its organization and methods of operations, together with further objects and advantages thereof, may best be understood by reference to the following description when taken in connection with the accompanying drawings wherein:

Figure 1:
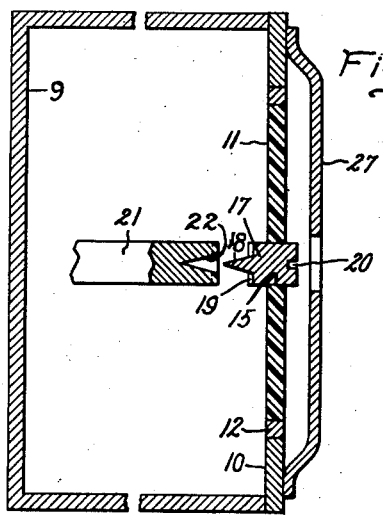
Fig. 1 is a cross-sectional view of one embodiment of the present invention.
Figure 2:
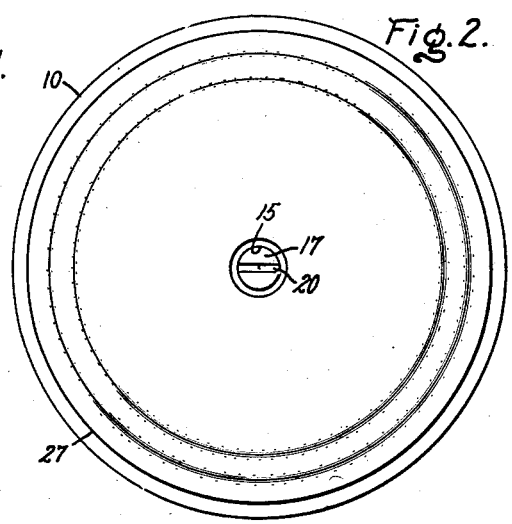
Fig. 2 is a front view of the embodiment depicted in Fig. 1.

Referring now to Fig. 1, a portion of a container 9 having a wall 10 is therein shown which hermetically seals electrical equipment from outside atmospheric conditions. A flexible diaphragm 11 which may be of plastic or other suitable resilient material, is fastened to the container wall 10 by any suitable means, here shown comprising a rigid ring 12 soldered to the container wall 10. The flexible diaphragm 11 has an aperture 15 at the center thereof in which is mounted an insert 17 of any suitable material. The insert 17 is mounted in the aperture 15 in such a way as to prevent relative rotation between diaphragm 11 and the insert 17. To this end, the insert can be molded or otherwise fixedly secured in aperture 15.

The inner end of the insert 17 is provided with means, here shown as teeth 19, for positively engaging a shaft 21 of the component to be controlled. The end of the shaft 21 adjacent the insert 17 is provided with a groove or slot 22 having a form complementary to a projection 18 on the inner end of the insert 17. The outer end of the insert 17 is provided with any suitable means for applying torque to the shaft 21, here shown as a screwdriver slot 20. When it is desired to apply torque to the shaft 21, a screwdriver is inserted in the slot 20 and the insert 17 is pressed into engagement with the shaft 21, the flexible diaphragm 11 stretching to enable the engagement. The insert 17 is then rotated, thereby rotating the shaft 21, the flexible diaphragm 11 also rotating. The degree of rotation is limited by the elasticity of the diaphragm 11, and when it is desired to rotate the shaft 21 beyond this limit it is necessary to relieve the pressure on the insert 17 thereby disengaging it from the shaft 21. The elasticity of the diaphragm 11 returns the insert 17 to its original position, and the process is repeated. The embodiment illustrated in Fig. 1 is utilized when the wall space of the container in which the electrical equipment is enclosed is not limited, but where the distance between the wall of the container and the shaft to be rotated is relatively small.

Figure 3:
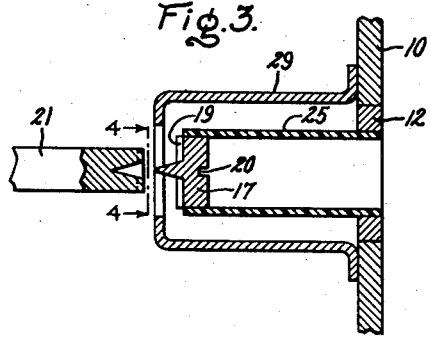
Fig. 3 is a cross-sectional view of another embodiment of the present invention.
Figure 4:
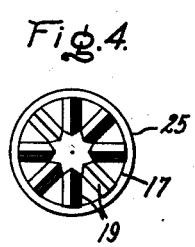
Fig. 4 is a view taken along line 4—4 of Fig. 3.

The embodiment of the invention illustrated in Fig. 3 is utilized where the wall space available for the torque transmitting device is limited but the amount of space available between the shaft to be rotated and the wall of the container to which the torque transmitting device is attached is relatively great. In this embodiment, the flexible diaphragm Fig. 1 comprises a cylindrically-shaped diaphragm member 25. The diaphragm 25 is attached to the container wall 10 by any suitable means, here shown as ring 12. The insert 17 which engages the shaft 21 is mounted at the inner end of the diaphragm 25 and is rigidly or fixedly attached at the inner end of the flexible diaphragm 25. In other details the embodiment of Fig. 3 is similar to the embodiment of Fig. 1.

Either embodiment may utilize a retaining cap to prevent bulging of the flexible diaphragms 11 or 25 when the pressure inside the container 9 differs from the pressure outside the container 10. The retaining cap is preferably placed on the side of the wall 10 which is exposed to the region of less pressure. This retaining cap prevents the bulging of the flexible diaphragm as result of the difference in pressure. In Fig. 1 a retaining cap 27 is disc-like in shape and is attached to the outside of the container wall 10, it being assumed that the pressure outside the container 10 is less than the pressure inside. In Fig. 3 a retaining cap 29 is shown in the form of a cylinder having an aperture in one end thereof. It is attached to the inside of the container wall 10, it being assumed that, in this case, the pressure on the outside of the container is greater than the pressure on the inside thereof. Manifestly, if the relative air pressures were opposite from that assumed, the retaining caps 27 and 29 would be placed on the opposite side of the diaphragms.

Figure 5:
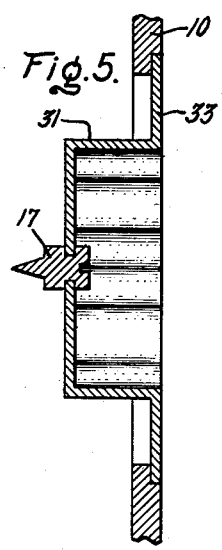
Fig. 5 is a cross-sectional view of still another modification of the present invention.
Figure 6:
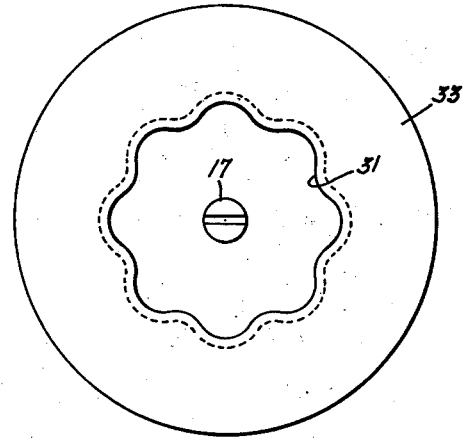
Fig. 6 is a front view of the embodiment illustrated in Fig. 5.

Figs. 5 and 6 depict a modification of the present invention wherein the flexible diaphragm comprises a corrugated metallic cylinder 31 attached to the container wall 10 as by radially extending flange 33 attached to or integrally formed with the cylinder 31. The flange 33 is attached to the container wall 10 by any suitable means, such as brazing. The flange 33 is of elastic material so as to provide in-out flexibility for an insert 17 similar to the corresponding elements of Figs. 1 and 3, and the corrugated metallic cylinder 31 provides rotational flexibility therefor. An exemplary material for the flange 33 and the cylinder 31 is 3–5 mil brass.

While the present invention has been described by reference to particular embodiments thereof, it will be understood that numerous modifications may be made by those skilled in the art without actually departing from the true spirit and scope of the invention.

What is claimed to be new and desired to be secured by Letters Patent of the United States is:

1. A device for transmitting torque through the wall of a hermetically-sealed chamber to a rotatable shaft mounted inside said shaft comprising a resilient disc member having a central aperture therein, means for mounting said resilient disc member in an aperture in said wall for preventing relative rotation between the periphery of said disc member and said wall, an insert mounted in said central aperture in said diaphragm and having inwardly and outwardly protruding ends, means at said outwardly-protruding end for receiving torque to be transmitted to said rotatable shaft, and means at said inwardly-protruding end for positively engaging said shaft when said insert is pressed into engagement with said shaft.

2. A device for transmitting torque through the wall of a hermetically-sealed chamber to a rotatable shaft mounted inside said chamber comprising a cylindrical resilient member mounted in an aperture in said chamber wall and extending into said chamber, said cylindrical member having central apertures in the inner and outer ends, means for fixedly attaching said outer end of said cylindrical member of said resilient member to said chamber wall to prevent relative rotation therebetween, an insert mounted in said inner end of said cylindrical resilient member and having a first end positioned adjacent said shaft and a second end protruding outwardly of said container, means at said first end to positively engage said rotatable shaft when said insert is moved into engagement therewith, and means at said second end for receiving torque to be transmitted to said rotatable shaft.

3. A device for transmitting torque through an aperture in the wall of a hermetically-sealed chamber to a rotatable shaft mounted in the interior of said chamber, comprising a cup-shaped corrugated metallic member, a flange at the open end of said member, a closed end of said member having a central aperture therein, means for attaching said flange to said wall so that said member covers said aperture in said wall, an insert mounted in said aperture in said member, means at one end of said insert for positively engaging said rotatable shaft, and means at the other end of said insert for receiving the torque to be transmitted to said shaft.

4. A device for transmitting torque through the wall of a hermetically-sealed chamber to a rotatable shaft mounted in the interior of said chamber, comprising a flexible diaphragm having a central aperture therein and mounted in an aperture in said wall, means for preventing relative rotation between the periphery of said diaphragm and said wall, an insert mounted in said central aperture in said diaphragm and having a first end protruding toward the interior of said chamber and a second end protruding toward the outside of said chamber, said second end having means for receiving torque to be transmitted to said rotatable shaft, means at said first end adapted to coact with said shaft when said insert is moved into engagement with said shaft so that said shaft rotates as said insert is rotated by said applied torque, and a retaining cup shaped in conformity to said flexible diaphragm and attached to said wall to prevent bulging of said flexible diaphragm caused by a difference in air pressure.

References Cited in the file of this patent

UNITED STATES PATENTS 2,395,843  Brown _____ Mar. 5, 1946

FOREIGN PATENTS 1,012,847  France _____ Apr. 23, 1952